Nov. 10, 1970 — W. C. RUDD — 3,539,760

ELECTRON BEAM FORGE WELDING

Filed Nov. 27, 1968 — 2 Sheets-Sheet 1

INVENTOR.
WALLACE C. RUDD
BY
Eli Weiss
ATTORNEY

Nov. 10, 1970     W. C. RUDD     3,539,760

ELECTRON BEAM FORGE WELDING

Filed Nov. 27, 1968     2 Sheets-Sheet 2

INVENTOR.
WALLACE C. RUDD
BY
*Eli Weiss*
ATTORNEY

United States Patent Office 3,539,760
Patented Nov. 10, 1970

3,539,760
ELECTRON BEAM FORGE WELDING
Wallace C. Rudd, Larchmont, N.Y., assignor to American Machine & Foundry Company, a corporation of New Jersey
Filed Nov. 27, 1968, Ser. No. 779,461
Int. Cl. B23k 31/06, 15/00
U.S. Cl. 219—121                                  4 Claims

ABSTRACT OF THE DISCLOSURE

In electron beam welding, as performed today, with either vacuum or non-vacuum type of equipment, the melt from the edges of the workpieces being joined is allowed to flow together and solidify to produce a pure cast type of weld. In this invention, a forge pressure is used in combination with an electron beam heating means to form a weld having improved characteristics.

---

This invention relates generally to methods and apparatus adapted for joining by welding two metal workpieces and more particularly to the forge welding together of the edges of a shaped metal strip or two metal workpieces, the weld areas being brought to final temperature by electron beam heating means.

It has become increasingly apparent that the ability to focus very large concentrations of electron beam power without having direct physical contact with the workpiece offers many important advantages; a major advantage being the minimizing of the total heat applied to the workpiece.

Electron beam welds, which approach the strength of the parent metal can be accomplished with vacuum type electron beam welding equipment and non-vacuum type electron beam welding equipment. Vacuum type electron beam welding has certain inherent disadvantages such as the requirement of pumping the vacuum system down after each loading, limitations in the size of the workpiece, and the difficulty encountered in manipulating large workpieces in a vacuum environment.

Non-vacuum type of electron beam welding avoids many of the difficulties above noted by bringing the beam directly into the atmosphere where it can be used to perform the welding functions desired.

While any non-vacuum type of electron beam welder can be used, in the type of non-vacuum type of electron beam welder in use today the orifice system is differentially pumped and designed to permit the section of the gun in which electrons are released to be at a pressure of the order of $10^{-5}$ torr, with the exit of the orifice system at atmospheric pressure. The electron beam is focused through the orifice system into the workpiece by a combination of electrostatic and electromagnetic electron optical lenses. A positive pressure, applied at a special gas protection orifice located just below the exit orifice of the gun, produces a flow of gas to the work area which directs contamination emanating from the work area away from the pumping orifices. This procedure appears to have proved to be very effective in minimizing contamination of the vacuum system, both by material vaporized from the work and by dust usually present in manufacturing areas. The protective gas orifice also permits control of the atomic number of the gas which is pumped into the vacuum system. The use of helium as the protective gas greatly minimized absorption of beam energy and scattering of beam electrons by gas within the orifice system. Gas diffusing from the protective gas nozzle, in addition to minimizing contamination of the system, also helps control the atmosphere in the immediate vicinity of the weld.

A non-vacuum electron beam welding type of unit which can be used with this invention is that manufactured by Hamilton Standard Division of United Aircraft Corporation.

At the present time, the preferred commercially utilized method of welding two metal workpieces together to form a continuous seam or the longitudinal seam when forming metal tubing with electron beam welding generally involves heating the opposed edges of the workpieces with an electron beam until the edges become molten or liquid and run together to form a pool of molten metal, and then removing the electron beam and allowing the molten metal to solidify forming a cast type of weld. The problems involved with this method are considerable. The two workpieces must be locked in position relative to each other and held perfectly still until the pool of molten metal solidifies; the pool of metal must not run off as, to do so, could cause a hole in the weld; the workpieces being welded together must be fitted together in a straight and true manner as the presence of voids between the two workpieces causes the weld seam to sag—the top surface of the weld seam being "stepped down" for the normal surfaces of the workpieces. If the workpieces do not fit together, the molten metal formed by the electron beam flows into and fills the small voids or the air spaces present between the two workpieces as a result of the poor or imperfect fit and a depressed weld seam results. Additionally, extreme care must be exercised to avoid the inclusion of impurities within the weld as impurities which become trapped in the liquid metal remain and become part of the weld to produce a defective weld.

The rate of welding, and the forming of the weld seam is limited not only by the speed at which the workpieces can be brought to their molten state, but also by the time required for the molten pool of metal to solidify. To move the workpieces or subject them to vibrations before the pool of metal solidifies could prevent the formation of a good weld.

It is an object of this invention to use an electron beam to bring the edges of workpieces which are to be welded together to a final heat suitable for forge welding.

It is another object of this invention to provide an improved weld of two workpieces brought to final heat by an electron beam.

It is still another object of this invention to increase the rate of welding of two workpieces brought to final heat by an electron beam.

It is still another object of this invention to provide an improved weld of two workpieces brought to final heat by an electron beam where the heat-affected zone is narrower than the electron beam.

It is still another object of this invention to provide a weld seam that does not sag between two workpieces brought to final heat by an electron beam.

It is still another object of this invention to provide an improved weld of two workpieces having irregularities or voids between the opposing edges and brought to final heat by an electron beam.

It is also another object of this invention to provide a more economical and reliable method of welding of two workpieces brought to final heat by an electron beam.

Other objects and many of the attendant advantages of this invention will be readily appreciated as the same becomes better understood by reference to the following detailed description when considered in connection with the accompanying drawings wherein.

Electron beam welding, as performed today, with either vacuum or non-vacuum type of equipment, operates at very slow speeds, usually in inches per minute and produces a melt between the two edges in a very narrow plane. In electron beam welding, the melt from the edges being joined is allowed to flow together and solidify to produce a pure cast type of weld. Additionally, electron beam welding equipment currently available has relatively low power ratings, production equipment being rated at 6 to 25 kw. input. Thus, the amount of metal that can be melted during any specific interval of time is limited.

By using, in combination with an electron beam heating means a forge pressure to join together two workpieces the following improvements are obtained:

(A) A very narrow heat-affected zone where the edges of the two workpieces are joined. Actually, the width of the heat-affected zone obtained is thinner than the electron beam because its width is reduced by the amount of metal squeezed out during the forge operations.

(B) The metal squeezed out from between the faces of the workpieces being joined carries away inclusions which, if left, could weaken the weld.

(C) The weld quality is better than the conventional electron beam weld as a forge weld works the metal and forms a better bond than a cast weld.

(D) There is no sag or depression in the weld area between the two workpieces being joined as is common with the conventional electron beam weld. Normally, with conventional electron beam welding the fit between the edges being welded governs the amount of sag that results as molten metal from the faces of the two workpieces being joined must comingle and, in doing so, fills all the small voids present between the two workpieces.

(E) The rate of welding can be increased by a measureable amount and the temperatures of the workpieces at the weld can be reduced slightly as the surfaces being joined need only be brought to their slightly molten or plastic state, not their completely molten state.

In this invention, the electron beam produces, with its low power, a slightly molten or plastic face on the edges that are to be welded together. The slightly molten or plastic metal together with surface impurities is squeezed out and surface irregularities present between the faces of the two workpieces being joined are eliminated by the action of the squeeze or forge rolls.

Figure 1:
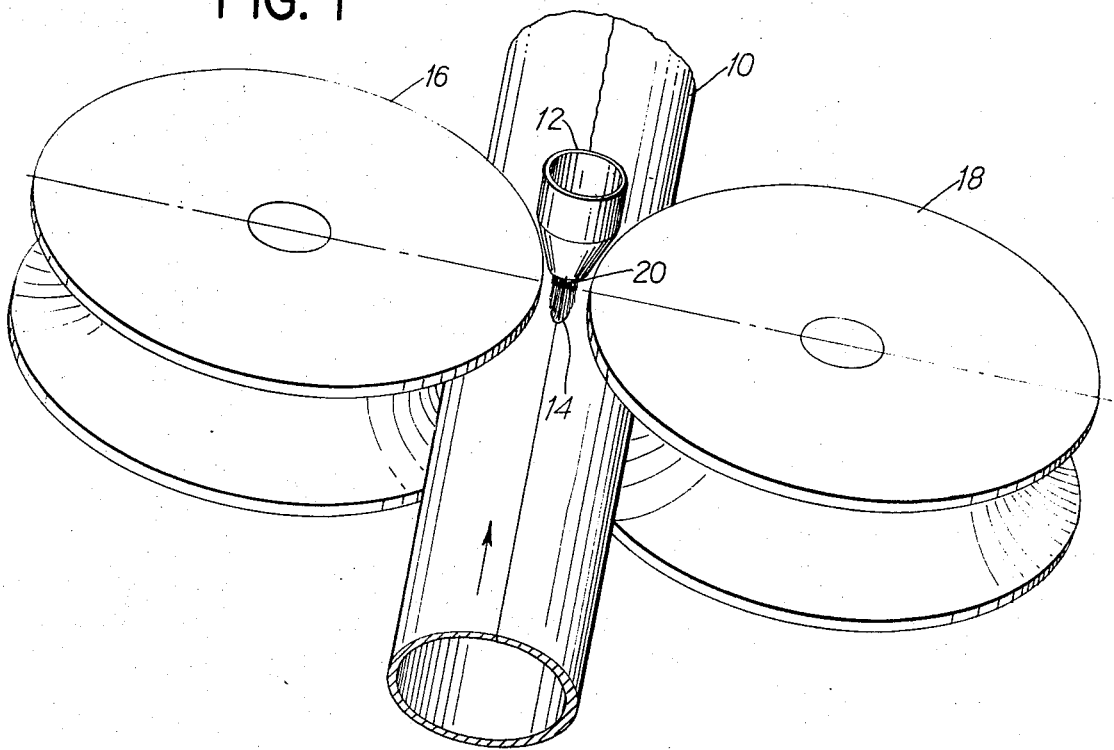
FIGS. 1 and 2 illustrate, in perspective, structure in accordance with the principles of this invention.

Referring to FIG. 1 there is illustrated structure in accordance with the principles of this invention. A length of flat strip stock 10 is advanced through shaping rolls, the edges of the strip being positioned to come together to form a tube.

An electron beam from an electron beam welding device 12 is positioned to impinge onto the edges of the strip 10 at the point 14 to heat the two edges to a plastic state.

The rate of advance of the strip 10 is adjusted to permit the electron beam to heat the two abutting faces or edges of the strip 10 as they advance past the electron beam. The centerline of two squeeze rolls 16, 18 positioned a short distance downstream from the point 14 intersects the abutting and plastic edges of the strip 10 at the point 20. The squeeze rolls 16, 18 force the edges of the strip 10 together under pressure, to forge weld the edges together, and a small amount of molten and plastic metal is squeezed out from between the faces of the edges of the strip 10 carries away inclusions originally present in and on the edges of the strip 10.

Figure 2:
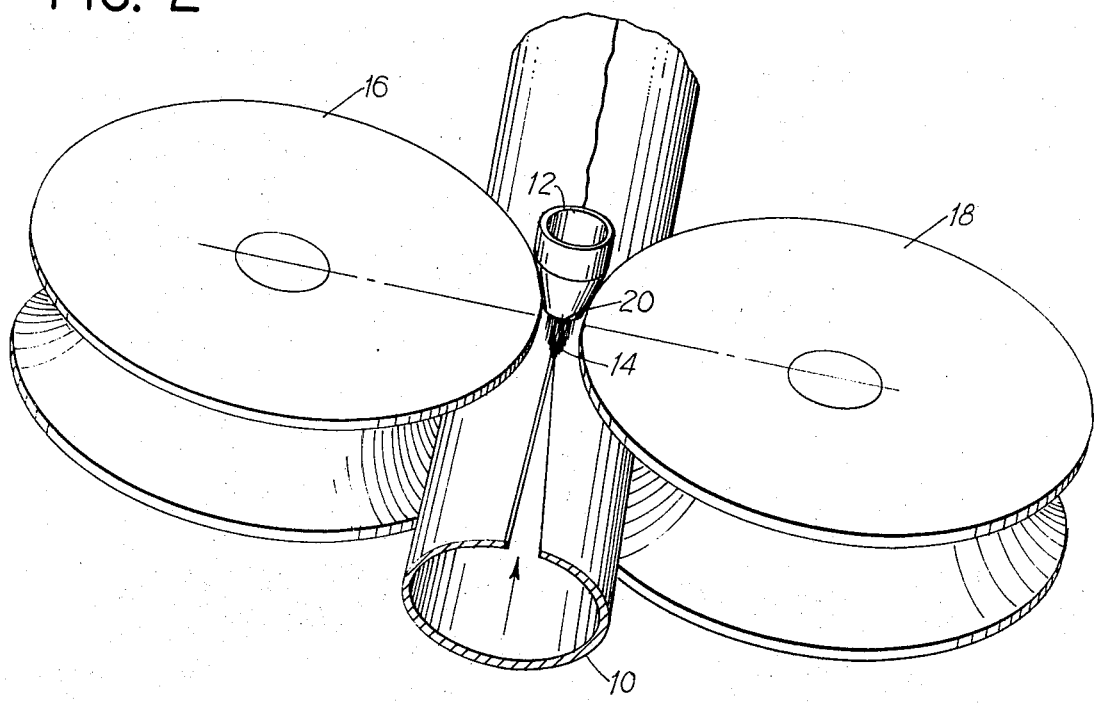

In FIG. 1 the edges of the strip 10 are brought to temperature while abutting each other. In some instances, it may be desirable to bring the edges to a desired temperature before they abut. Referring to FIG. 2, the edges of the strip 10 form a V-shaped gap, the apex of the gap being positioned at or slightly upstream from the point 20. The electron beam from an electron beam welding device 12 is positioned to impinge upon the edges of the strip 10 at the apex of the gap. Thus, the apex of the gap in FIG. 2 is equivalent to the point 14 of FIG. 1. The electron beam can be adjusted to follow a path that is at right angles or normal to the weld seam being formed as illustrated in FIGS. 2 and 3; or, as illustrated in FIG. 3, the electron beam can be adjusted to follow a path that forms an angle with the weld seam being produced.

In those instances where a V-shaped gap is present between the edges being joined as illustrated in FIG. 2, a small portion of the electron beam may pass through the V gap and, where a tube is being formed, the electron beam will strike the opposite wall of the tube. If the heating of the opposite wall of the tube by the electron beam is not desired, a water-cooled absorber means can be positioned within the tube to interrupt the electron beam.

Figure 3:
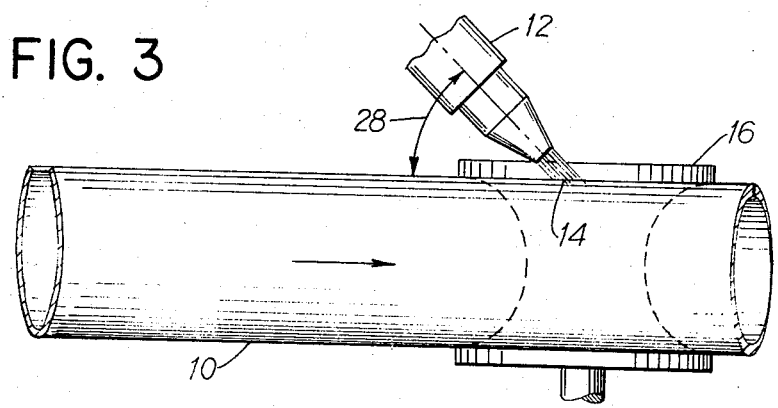
FIG. 3 is a view, in side elevation, of structure in accordance with the principles of this invention.

Referring now to FIG. 3 there is illustrated a side elevation view of structure in accordance with the principles of this invention showing a squeeze roll, and the electron beam generating means 12 being positioned to direct an electron beam at some other angle 28 to the weld seam, the electron beam impinging upon the edges to be welded at the apex of the V gap when used with the arrangement illustrated in FIG. 2.

Figure 4:
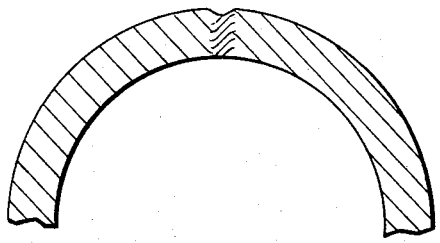
FIG. 4 is a view in section of a weld made in the conventional manner.

FIG. 4 illustrates, in section, a typical weld seam obtained when practicing conventional electron beam welding. Note the presence of the sag, and the width of the weld seam.

Figure 5:
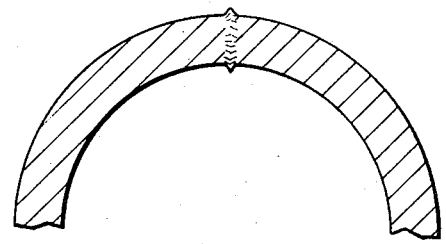
FIG. 5 is a view in section of a weld made in accordance with the principles of this invention.

Referring now to FIG. 5, there is illustrated, in section, a typical weld seam obtained when using the structure of this invention. The electron beam heats the surfaces to be joined to a plastic state, and the surfaces are then squeezed together to form a forge type weld. The squeezing together of the two surfaces provides a weld that has no sag, is stronger than the conventional electron beam weld—a forge weld being stronger than a cast weld; is narrower in width than the conventional electron weld, contains less impurities than the conventional electron beam weld; and, can be made faster and the parts remain cooler than during conventional electron beam welding as the metal does not have to be brought up to its liquid state.

The top and bottom upsets with their squeezed-out impurities may be scarfed or cut off as the weld is being made leaving a smooth surface with no sag or indentation.

While the invention has been described above with reference to its use for welding tubing, it is to be understood that this invention can be used to weld together two workpieces having other shapes, configurations and characteristics.

Obviously many modifications and variations of the present invention are possible in the light of the above teachings. It is, therefore, to be understood that within the scope of the appended claims the invention may be practiced otherwise than as specifically described herein.

What is claimed is:

1. A method of electron beam welding to join together metal workpieces with a forge weld, the method comprising the steps
    bringing the workpieces adjacent each other along a desired weld line,
    directing an electron beam onto the adjacent workpieces in a non-vacuum environment to heat adjacent portions of the workieces to the slighly molten or plastic state,
    applying sufficient pressure to the workpieces to force together the heated portions to squeeze out slightly molten metal with any impurities and inclusions therein from between the workpieces to form a forge weld therebetween.

2. The method of claim 1 wherein said workpieces are adjacent edges of an unwelded tube, and said step of bringing the workpieces together includes the step of shaping a flat strip into a tubular shape.

3. The method of claim 2 wherein said workpieces are positioned side to side with their edges meeting at or adjacent a weld point, said workpieces being spaced apart upstream of the weld point, said electron beam impinging upon edges adjacent the weld point.

4. The method of welding together metal workpieces with a forge weld, the method comprising the steps
bringing the workpieces adjacent each other along a desired weld line,
directing an electron beam onto the adjacent workpieces in an non-vacuum atmosphere to heat adjacent portions of the workpieces upon which the electron beam impinges to the slightly molten or plastic state
providing relative motion between the electron beam and the workpieces,
applying sufficient pressure to the workpieces to force together the heated portions to squeeze out slightly molten or plastic metal with impurities therein from betwen the workpieces to form a forge weld therebetween.

References Cited

UNITED STATES PATENTS

| 2,716,691 | 8/1955 | Bowman | 219—61 |
| 2,844,705 | 7/1958 | Bowman et al. | 219—61 |
| 3,131,284 | 4/1964 | Gibson | 219—61 |
| 3,136,883 | 6/1964 | Radtke | 219—121 |
| 3,230,339 | 1/1966 | Opitz et al. | 219—121 |
| 3,258,576 | 6/1966 | Schleich et al. | 219—121 |
| 3,294,928 | 12/1966 | Schafer | 219—67 |
| 3,426,173 | 2/1969 | Steigerwald | 219—121 |
| 3,089,021 | 5/1963 | Hawes et al. | 219—104 |

FOREIGN PATENTS 1,176,296   8/1964   Germany.

JOSEPH V. TRUHE, Primary Examiner

P. W. GOWDEY, Assistant Examiner

U.S. Cl. X.R.
219—59, 61, 78, 104